United States Patent
Munirathinam et al.

(10) Patent No.: US 11,582,769 B2
(45) Date of Patent: Feb. 14, 2023

(54) RADIO NETWORK NODE, USER EQUIPMENT (UE), SYSTEM AND METHODS PERFORMED THEREIN FOR HANDLING COMMUNICATION IN A WIRELESS COMMUNICATION NETWORK

(71) Applicant: Telefonaktiebolaget LM Ericsson (publ), Stockholm (SE)

(72) Inventors: Karthick Munirathinam, Chennai (IN); Savitha Aravindhan, Chennai (IN); Divya Sundar, Chennai (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/962,873

(22) PCT Filed: Feb. 23, 2018

(86) PCT No.: PCT/IN2018/050095
§ 371 (c)(1),
(2) Date: Jul. 17, 2020

(87) PCT Pub. No.: WO2019/162953
PCT Pub. Date: Aug. 29, 2019

(65) Prior Publication Data
US 2020/0344772 A1    Oct. 29, 2020

(51) Int. Cl.
*H04W 72/10* (2009.01)
*H04W 28/20* (2009.01)

(52) U.S. Cl.
CPC ........... *H04W 72/10* (2013.01); *H04W 28/20* (2013.01)

(58) Field of Classification Search
CPC ............ H04W 4/80; H04W 8/18; H04W 4/50
See application file for complete search history.

(56) References Cited

U.S. PATENT DOCUMENTS

| 6,118,791 | A  |   | 9/2000 | Fichou et al. |
| 6,366,761 | B1 |   | 4/2002 | Montpetit |
| 7,477,632 | B1 | * | 1/2009 | Radhakrishnan ..... H04L 63/104 370/338 |

(Continued)

FOREIGN PATENT DOCUMENTS

WO    2004057812 A1    7/2004

OTHER PUBLICATIONS

PCT International Search Report and Written Opinion dated Apr. 17, 2018 for International Application PCT/IN2018/050095, 8 pages.

(Continued)

*Primary Examiner* — San Htun
(74) *Attorney, Agent, or Firm* — Sage Patent Group

(57) ABSTRACT

According to an embodiment herein a method performed by a radio network node for handling communication of data for a user equipment, UE, served in a service area associated with the radio network node in a wireless communication network is herein provided. The radio network node receives an indication from the UE, wherein the indication indicates a priority level for bandwidth allocation compared to other UEs. The radio network node further allocates a first bandwidth out of a total bandwidth to the UE for communication, wherein the first bandwidth is allocated in size based on the indication.

15 Claims, 9 Drawing Sheets

(56) References Cited

U.S. PATENT DOCUMENTS

| | | | |
|---|---|---|---|
| 2004/0062273 A1 | 4/2004 | Frank et al. | |
| 2007/0208864 A1* | 9/2007 | Flynn | H04W 12/062 709/227 |
| 2008/0219170 A1* | 9/2008 | Marcellin | H04L 12/14 370/238.1 |
| 2011/0294502 A1* | 12/2011 | Oerton | H04W 4/50 455/426.1 |
| 2012/0057537 A1 | 3/2012 | Schein et al. | |
| 2012/0240205 A1* | 9/2012 | Casey | H04L 47/803 370/235 |
| 2016/0007394 A1* | 1/2016 | Hassan | H04W 28/18 455/450 |
| 2017/0026987 A1* | 1/2017 | Velu | H04W 72/1242 |
| 2017/0135109 A1 | 5/2017 | Keon | |

OTHER PUBLICATIONS

Extended European Search Report for European Patent Application No. 18906780.4 dated Sep. 24, 2021, 9 pages.

* cited by examiner

RADIO NETWORK NODE, USER EQUIPMENT (UE), SYSTEM AND METHODS PERFORMED THEREIN FOR HANDLING COMMUNICATION IN A WIRELESS COMMUNICATION NETWORK

TECHNICAL FIELD

Embodiments herein relate to a radio network node, a UE, a system and methods performed therein for handling communication. Furthermore, a computer program product and a computer readable storage medium are also provided herein. In particular, embodiments herein relate to handling communication of data for the UE.

BACKGROUND

In a typical wireless communication network, user equipments (UE), also known as wireless communication devices, mobile stations, stations (STA) and/or wireless devices, communicate via a Local Area Network such as a WiFi network or a Radio Access Network (RAN) to one or more core networks (CN). The RAN covers a geographical area which is divided into service areas or cells, which may also be referred to as a beam or a beam group, with each service area being served by a radio network node such as a radio access node e.g., a Wi-Fi access point or a radio base station (RBS), which in some networks may also be denoted, for example, a NodeB, eNodeB (eNB), or gNB as denoted in 5G. A service area is a geographical area where radio coverage is provided by the radio network node. The radio network node communicates over an air interface operating on radio frequencies with the UE within range of the radio network node.

Nowadays WiFi service is predominant in many commercial places. In existing technology, a wireless infrastructure comprising a centralized controller can identify and differentiate handling of services between different users. This is done through pre-configured user profiles. Once the user is identified and classified e.g. as a preferential user, predefined bandwidth is allocated to this user which may be higher compared to the other categories of users. A preferential user is a user of higher importance, e.g. a user with a premium subscription or a user with a demand of higher quality of services e.g. throughput or similar, compared to other users. Other existing ways to provide differential bandwidth is through static configuration of varying bandwidth for different UEs such as phone, tablet, or laptop, and for different services such as video, messaging and other services.

In existing technology, when the user holds multiple UEs that are connected to one and the same WiFi access point, bandwidth will get evenly allocated to all the connected UEs statically. FIG. 1 discloses wherein different departments in an office have different access points and a radio network node such as a WLAN controller allocates bandwidth equally to connected UEs. Thus, sessions are handled in a non-flexible manner wherein performance of the wireless communication network perceived by the user of a UE may be limited or reduced since the radio network node is handling all connections in a rigid manner. Since it is not possible to prioritize between UEs connected to an access point, the bandwidth available to the user is spread between all the UEs connected to the access point without considering the requirement of the user at that point of time. And since all the UEs share the allocated bandwidth, some background applications of a UE may consume bandwidth resulting in lesser speed on other connected UEs, which the user might not prefer. The user may manually intervene and change settings for the different UEs, which is time consuming and ineffective.

SUMMARY

An object of embodiments herein is to provide a mechanism for handling communication of data for one or more UEs in a flexible manner.

According to an aspect of embodiments herein the object is achieved by providing a method performed by a radio network node for handling communication of data for a UE served in a service area associated with the radio network node in a wireless communication network. The radio network node receives an indication from the UE, wherein the indication indicates a priority level for bandwidth allocation compared to other UEs. The radio network node further allocates a first bandwidth out of a total bandwidth to the UE for communication, wherein the first bandwidth is allocated in size based on the indication.

According to another aspect of embodiments herein the object is achieved by providing method performed by a UE for handling communication of data in a service area associated with a radio network node in a wireless communication network. The UE transmits an indication to the radio network node, wherein the indication indicates a priority level of bandwidth allocation compared to other UEs.

It is furthermore provided herein a computer program product, such as a computer program, comprising instructions, which, when executed on at least one processor, cause the at least one processor to carry out any of the methods above, as performed by the radio network node or the UE. It is additionally provided herein a computer-readable storage medium, having stored thereon a computer program product comprising instructions which, when executed on at least one processor, cause the at least one processor to carry out the method according to any of the methods above, as performed by the radio network node or the UE.

According to yet another aspect the object is achieved by providing a radio network node for handling communication of data for a UE served in a service area associated with the radio network node in a wireless communication network. The radio network node is configured to receive an indication from the UE, wherein the indication indicates a priority level for bandwidth allocation compared to other UEs. The radio network node is further configured to allocate a first bandwidth out of a total bandwidth to the UE for communication, wherein the first bandwidth is allocated in size based on the indication.

According to still another aspect the object is achieved by providing a UE for handling communication of data in a service area associated with a radio network node in a wireless communication network. The UE is configured to transmit an indication to the radio network node, wherein the indication indicates a priority level of bandwidth allocation compared to other UEs.

According to yet still another aspect the object is achieved by providing a system for handling communication of data of a UE in a service area associated with a radio network node in a wireless communication network. The UE is configured to transmit an indication to the radio network node, wherein the indication indicates a priority level for bandwidth allocation compared to other UEs. The radio network node is configured to allocate a first bandwidth out of a total bandwidth to the UE for communication, wherein the first bandwidth is allocated in size based on the indication.

According to another aspect the object is achieved by providing method performed by a system for handling communication of data of a UE in a service area associated with a radio network node in a wireless communication network. The system comprises the UE and the radio network node. The system transmits, by the UE, an indication to the radio network node, wherein the indication indicates a priority level for bandwidth allocation compared to other UEs. The system further allocates, by the radio network node, a first bandwidth out of a total bandwidth to the UE for communication, wherein the first bandwidth is allocated in size based on the indication.

By allocating bandwidth to a UE as indicated by a user, the UE held connected to an access node e.g. the radio network node or an access node controlled by the radio network node, may get wider bandwidth compared to other UEs e.g. as customized by the user of the UEs. Furthermore, the total bandwidth available to the UEs of the user may be limited through a preconfigured user profile such as according to a subscription. By this, both end user experience and correct priority of bandwidth allocation for the UEs are achieved. Embodiments ensure whenever a UE, preferential to the user out of a number of UEs connected to an access node, is using a service a major part of the total bandwidth may be allocated to the UE indicated as preferential from the user. Thus, not all the UEs get equal bandwidth allocated, which allows the user to maintain UEs in connection that needs low data usage in an efficient manner in term of bandwidth used. For example, during a day of meetings a user would prefer higher bandwidth for a laptop over a mobile phone the user is carrying. Thus, when entering a wireless local access network (WLAN) the user indicates to the radio network node such as a WiFi controller that the laptop should use 70 percent of the allocated bandwidth and the mobile phone should use the rest, 30 percentage. Hence, the proposed solution avoids static configuration of bandwidth allocated to UEs and provides a user defined dynamic priority change for UEs. Reprioritization of UEs may be done by user at any point of time so that depending on varying user need, the bandwidth precedence is allocated.

BRIEF DESCRIPTION OF THE DRAWINGS

Embodiments will now be described in more detail in relation to the enclosed drawings, in which.

DETAILED DESCRIPTION

Figure 1:
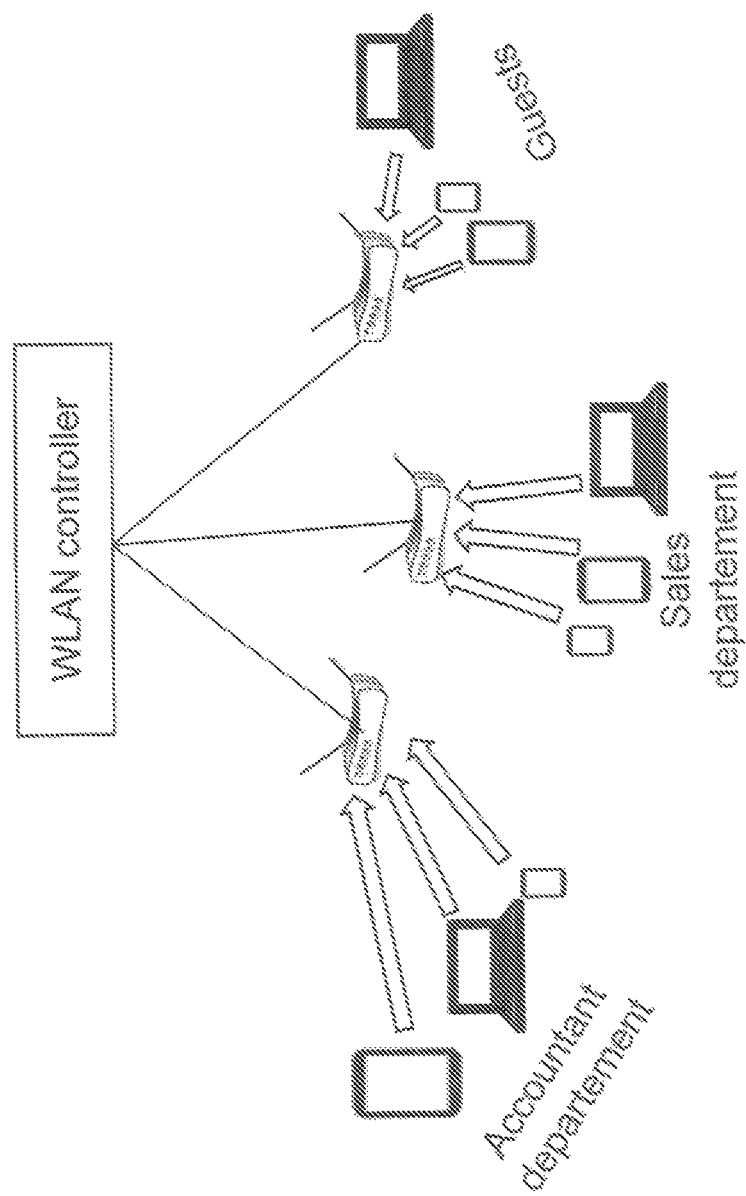
FIG. 1 shows an overview of a wireless communication network using access nodes.
Figure 2:
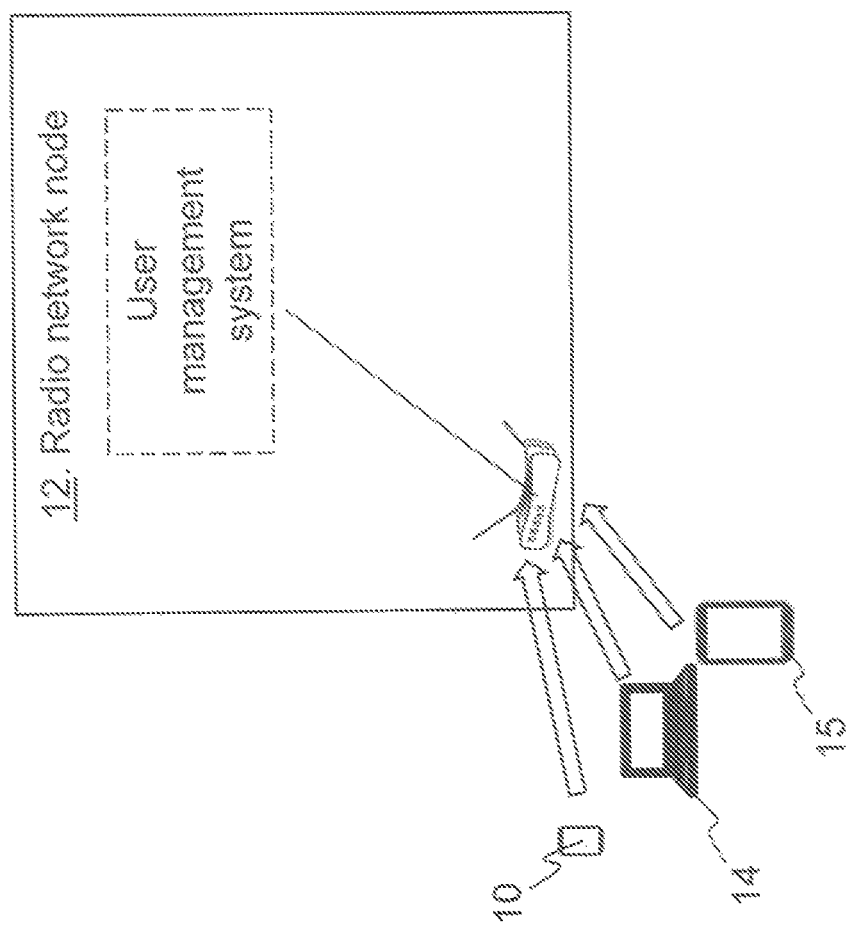
FIG. 2 shows a schematic overview depicting a wireless communication network according to embodiments herein.

Embodiments herein relate to communication networks in general. FIG. 2 is a schematic overview depicting a wireless communication network 100. Embodiments may be applicable to Wi-Fi and also to further development of other communication systems such as NR, 3G and LTE.

In the communication network 100, UEs, e.g. a UE 10 and a second UE 14, a third UE 16, such as a mobile device, a node with one or more sensors, a wireless device, a mobile station, a non-access point (non-AP) Station (STA), a STA, a user equipment and/or a wireless terminal, are connected to the one or more CNs via a RAN such as a WiFi access network. It should be understood by those skilled in the art that "UE" is a non-limiting term which means any terminal, wireless communication terminal, communication equipment, Machine Type Communication (MTC) device, Device to Device (D2D) terminal, or user equipment e.g. smart phone, laptop, mobile phone, sensor, camera, relay, mobile tablets or any device communicating within a cell or service area. The UEs may be of different types wherein a type a UE is defined by a certain identifier and/or a capability of the UE. The UE 10 may be of a first type with a first capability, and the second and third UE may be of a second and third type with a second and third capability. A capability may comprise a processing capability, a memory capability, a display and/or a communication rate capability.

The communication network 100 comprises a radio network node 12 providing or controlling radio coverage over a geographical area referred to as service area or cell, which may be provided by one or more beams or a beam group where the group of beams is covering the service area of a first radio access technology (RAT), such as NR, 5G, LTE, Wi-Fi or similar. The radio network node 12 may be a transmission and reception point e.g. a radio-access network node such as a Wireless Local Area Network (WLAN) access point or Access Point Station (AP STA), an WLAN controller, a base station e.g. a radio base station such as a gNodeB, NodeB, an evolved Node B (eNB, eNode B), a base transceiver station, a radio remote unit, an Access Point Base Station, a base station router, a transmission arrangement of a radio base station, a stand-alone access point or any other network unit capable of communicating with a UE within the service area served by the radio network node depending e.g. on the radio access technology and terminology used. The radio network node 12 communicates with the UE 10 with Downlink (DL) transmissions to the UE 10 and Uplink (UL) transmissions from the UE 10. In embodiments herein the radio network node 12 is exemplified as a WLAN controller.

In prior art there is no difference between handling communication for the UE 10 and any other UE accessing the wireless communication network 100. The UE 10 may be a preferential UE for the user of the UEs. Preferential UE meaning that a user of the UE or a user actually in control of the radio network node 12 indicates a higher priority for the UE than for other types of UEs e.g. indicate that the UE 10 has a higher demand of quality of service or similar.

Embodiments herein disclose where the radio network node 12 receives an indication from the UE 10, which indication indicates a priority level for bandwidth allocation compared to other UEs. The radio network node 12 then allocates a first bandwidth, e.g. size of bandwidth, out of a total bandwidth to the UE 10 for communication, wherein the first bandwidth is allocated in size based on the indication. A second UE may be allocated a second bandwidth being smaller than the first bandwidth.

Embodiments herein allow that a certain UE such as the UE 10 among many UEs, e.g. held by a user, connected to the radio network node 12 can be given high preference compared to the other UEs. This prioritization is done through the indication provided by the user and may be reprioritized at any point of time by the user. The radio network node 12, such as a WiFi controller, may be equipped with a user management system, which user management system may manage the user profile and associated UEs to dynamically allocate bandwidth for different types of UEs.

Embodiments herein may handle an access request from the UE 10 of a preferential client e.g. allocating a larger part of the total bandwidth to the UE 10, whereas a request from the second UE 14 is handled according to a preconfigured configuration, such as allocating a minimum bandwidth to the second UE 14 wherein the minimum bandwidth is smaller than the larger part allocated to the UE 10.

Embodiments herein enable communication for UEs 10,14,16 to be handled dynamically e.g. different bandwidths may be allocated by the radio network node 12 for different UEs based on the indication from the UE 10. E.g. one bandwidth is allocated to the UE 10 for high performance or higher required quality of service and another, smaller, bandwidth is allocated to the second UE 14 and third UE 16. By implementing embodiments herein a dynamical handling of UEs is achieved since the UE 10 are allocated a larger part of the bandwidth compared to the second UE 14 and third UE 16.

Figure 3:
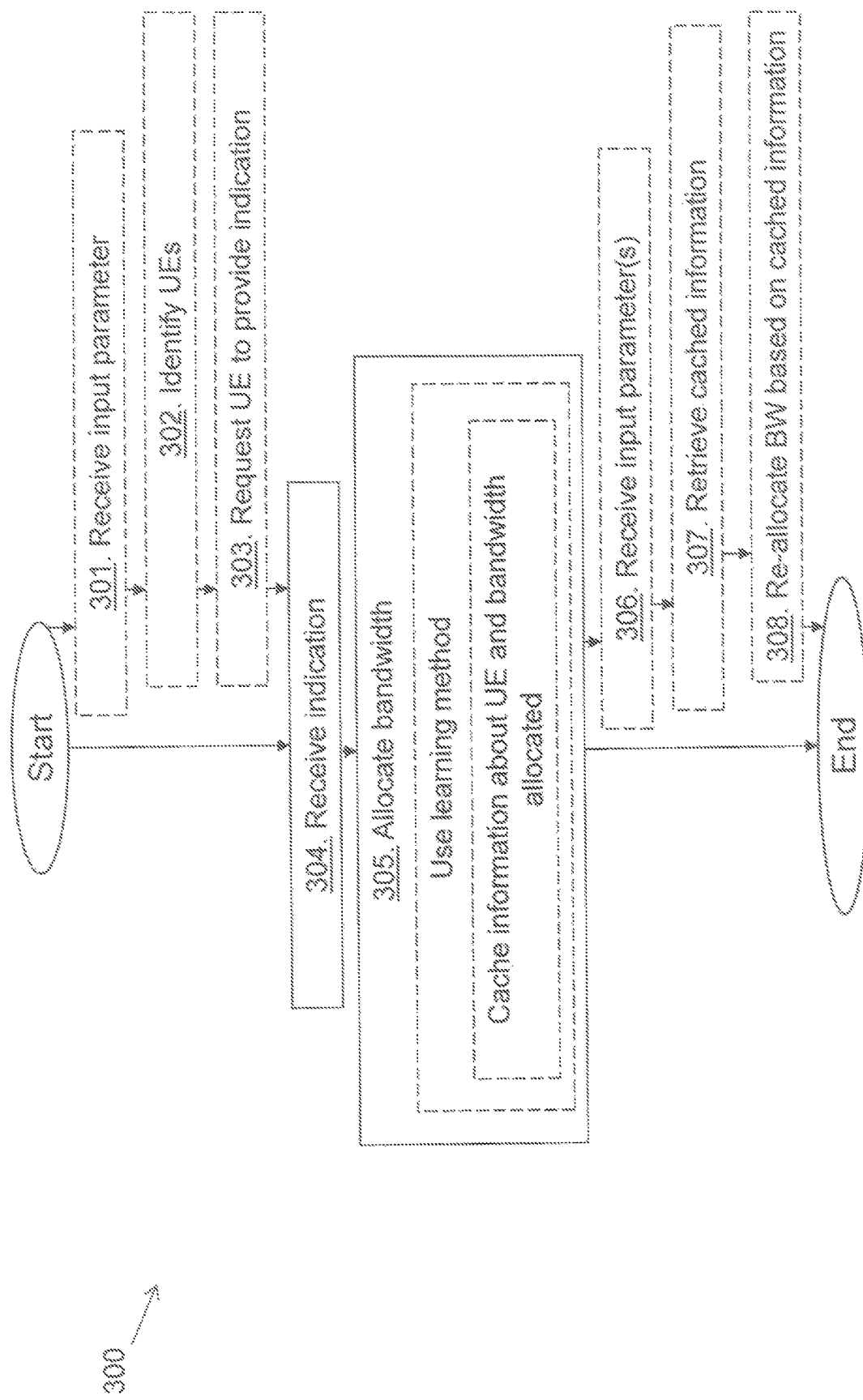
FIG. 3 shows a flowchart depicting a method performed by the radio network node according to embodiments herein.

The method actions of a method 300 performed by the radio network node 12, such as a WLAN controller or similar, for handling communication of data for the UE 10 served in the service area associated with the radio network node 12 in the wireless communication network 100 according to embodiments will now be described with reference to a flowchart 300 depicted in FIG. 3. The actions do not have to be taken in the order stated below, but may be taken in any suitable order. Actions performed in some embodiments are marked with dashed boxes. The method may be for handling bandwidth allocation for one or more UE in a preferential manner.

Action 301. The radio network node 12 may receive one or more input parameters from the UE, which one or more input parameters indicate identity of a user of the UE and/or type of the UE. The one or more input parameters comprise an identity of the UE, a user name associated with the UE, and/or a password.

Action 302. The radio network node 12 may identify the other UEs taking the received one or more input parameters into account. The radio network node 12 may e.g. identify the other UEs belonging to a same user as the UE 10, e.g. the radio network node may based on the identity of the user identify other connected UEs of the same user.

Action 303. The radio network node 12 may further request the UE to provide the indication to the radio network node 12. The radio network node 12 may e.g. provide a graphic user interface such as an HTML page to the UE 10. The graphic user interface may comprise one or more field for the UE 10 to input the indication.

Action 304. The radio network node 12 receives the indication from the UE 10. The indication indicates a priority level for bandwidth allocation compared to other UEs. The UE and other UEs are of different types of UEs, e.g. laptop and mobile phones, and/or UEs of different capabilities e.g. different processing capacities. The indication may comprise a priority level and/or a percentage of the total bandwidth.

Action 305. The radio network node 12 allocates the first bandwidth, out of the total bandwidth, to the UE 10 for communication, wherein the first bandwidth is allocated in size based on the indication. E.g. the radio network node may use a learning method, wherein the learning method is for learning allocation of bandwidth e.g. in size or percentage of total bandwidth, mapped to UE identities and/or types of UEs. A type of UE may be defined by a certain ID and/or a capability. The learning method may be based on past behaviour of one or more UEs and/or user of UEs. The radio network node may cache information about the UE and bandwidth allocated to the UE 10.

The learning method may be used to allocate bandwidth considering both the user input and user profile.

The following table shows an example of the percentage of bandwidth allocated to users based on the profile.

TABLE 1

The mapping between the user profile and % of bandwidth

| Profile of user | Percentage of bandwidth to be allotted ($u_p$) |
|---|---|
| Gold | 60 |
| Silver | 30 |
| Bronze | 10 |

The UE priority is obtained as input indication from the user, an example of which is illustrated in the following table.

TABLE 2

Device priority input from user

| UE name | Priority ($p_r$) |
|---|---|
| IPhone | 1 |
| Laptop | 2 |
| IPad | 3 |

Following equations may be used in determining the bandwidth allocation to the UEs according to their priority.

$$rd_p \text{(relative device priority)} = u_p / p_r \qquad (1)$$

$$cs_b \text{(cumulative bandwidth sum)} = u_p \bigg/ \sum_{r=1}^{n} rd_p \qquad (2)$$

$$d_b \text{(device bandwidth)} = rd_p * cs_b \qquad (3)$$

Below is an example which shows the bandwidth allocation according to these equations of a user with a Gold user profile with three UEs. In this case, the gold user profile has total of 60% bandwidth allocation according to the table 1 and UE priority is as per the table 2 which is input from the user. Hence applying the three equations, the device bandwidth ($d_b$) is obtained as mentioned below.

| Device name | Priority ($p_r$) | $rd_p$ | $cs_b$ | $d_b$ (Mbps) |
|---|---|---|---|---|
| IPhone | 1 | 60 | 0.54 | 32.4 |
| Laptop | 2 | 30 | 0.54 | 16.2 |
| IPad | 3 | 10 | 0.54 | 5.4 |

The $d_b$ represents the bandwidth to be allotted to the device in terms of Megabits per second (Mbps). Since the user has chosen IPhone with highest priority, maximum bandwidth is allotted to that device relatively as compared with others. In the same way, bandwidth allocation is done to devices of Silver and Bronze user profiles.

Action 305. The radio network node may further receive input parameters from the UE 10 later in time.

Action 306. The radio network node 12 may then retrieve the cached information. The radio network node 12 may use the learning method to retrieve the information.

Action 307. The radio network node 12 may further re-allocate bandwidth for the UE based on the retrieved information.

Figure 4:
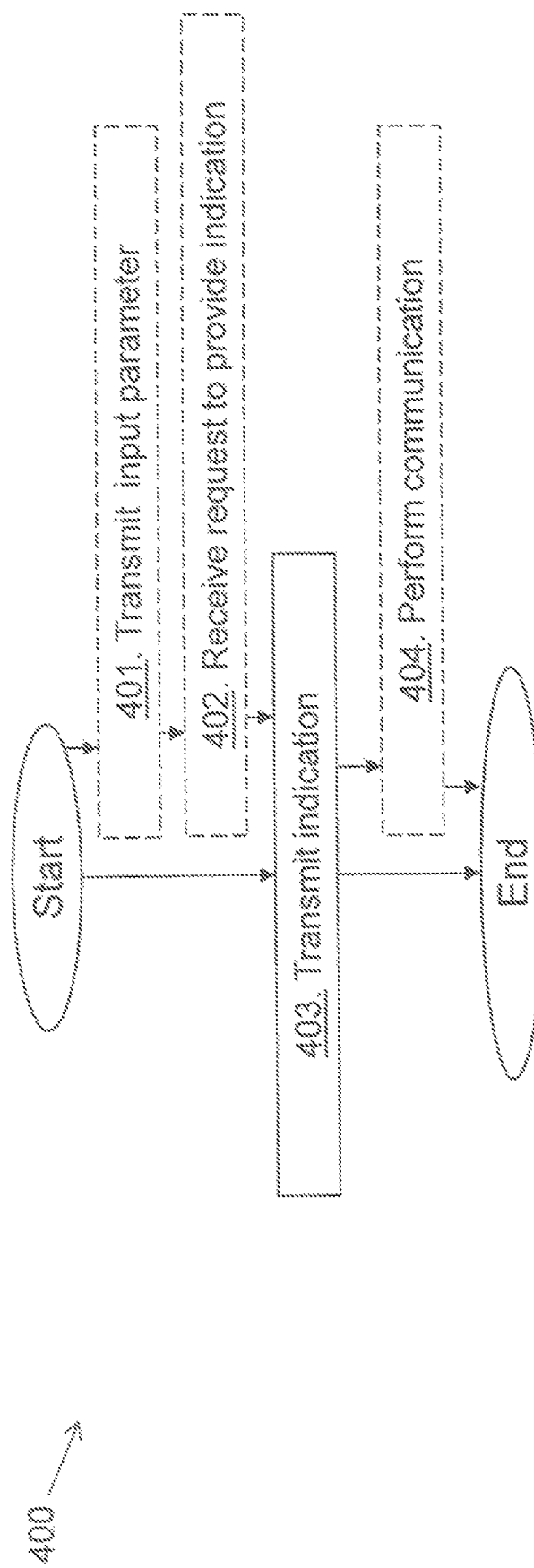
FIG. 4 shows a block diagram depicting a method performed by a UE according to embodiments herein.

The method actions of a method 400 performed by the UE 10 for handling communication of data in a service area associated with the radio network node in the wireless communication network 100 according to embodiments will now be described with reference to a flowchart 400 depicted in FIG. 4. The actions do not have to be taken in the order stated below, but may be taken in any suitable order. Actions performed in some embodiments are marked with dashed boxes.

Action 401. The UE 10 may transmit the one or more input parameters to the radio network node 12, which one or more input parameters indicate identity of a user of the UE and/or type of the UE. The one or more input parameters may comprise the identity of the UE, the user name associated with the UE, and/or the password.

Action 402. The UE 10 may receive the request from the radio network node, wherein the request requests the UE 10 to provide the indication to the radio network node. The request may comprise the graphic user interface for the UE, wherein the graphic user interface page comprises one or more fields for the UE to input the indication.

Action 403. The UE 10 transmits the indication to the radio network node 12, wherein the indication indicates a priority level of bandwidth allocation compared to other UEs. The UE and other UEs may be of different types of UEs and/or different capabilities. The indication may comprise the priority level and/or a percentage of the total bandwidth.

Action 404. The UE 10 may then perform a service using the allocated bandwidth.

Figure 5:
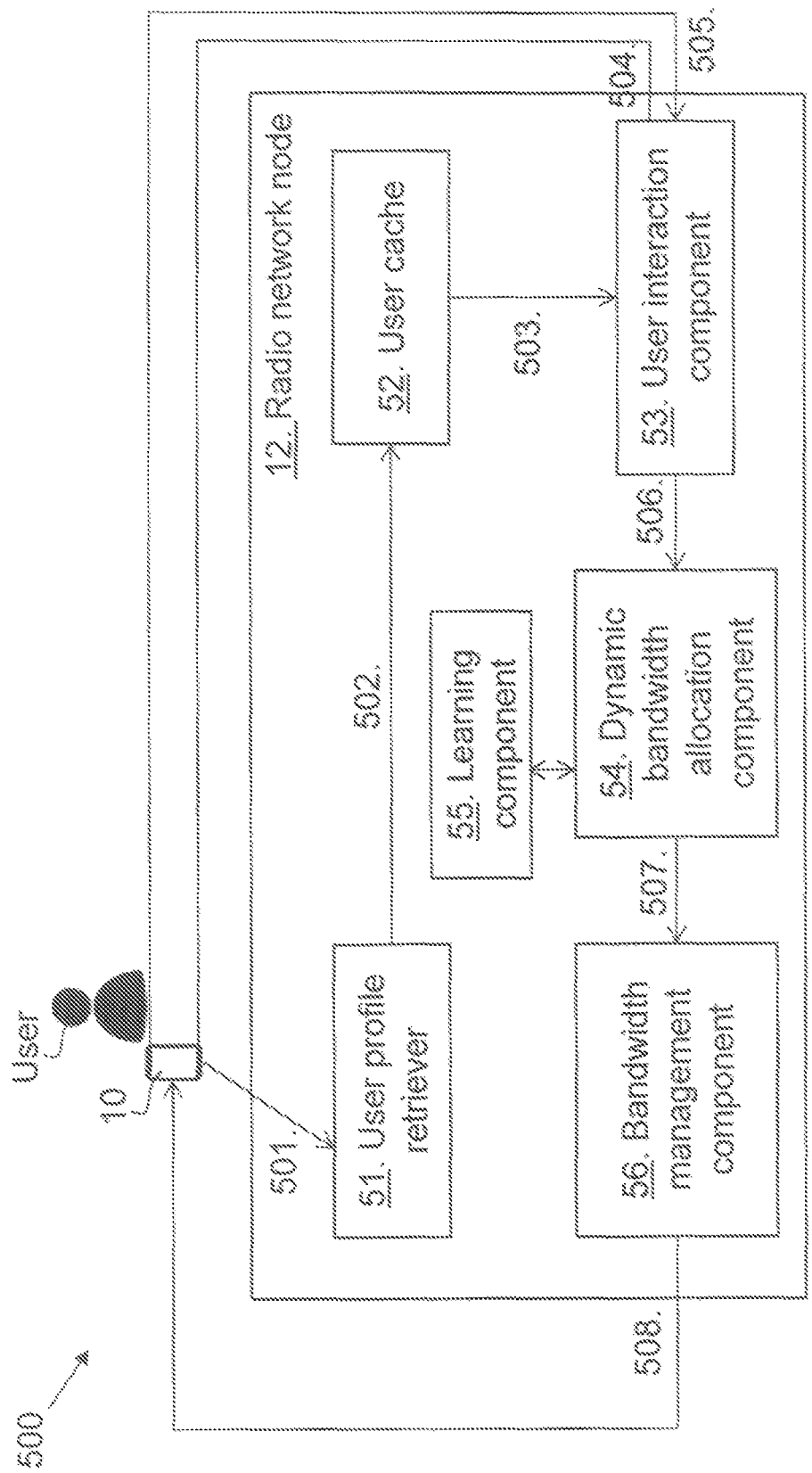
FIG. 5 shows a method for handling communication of the UE according to embodiments herein.

FIG. 5 is a schematic overview depicting a method 500 for handling communication of the UE 10 according to an embodiment wherein the UE 10 enters into e.g. a WiFi network controlled by the radio network node 12 such as a WLAN controller.

Action 501. The UE 10 may log in to a WiFi network using one or more credentials. A user profile retriever 51 comprised in the radio network node 12 may retrieve a user profile of the user of the UE 10 and a total bandwidth for the user according to an subscription. The UE 10 may provide UE ID, user name and/or password. The user profile retriever 51 may thus the retrieve subscription information based on the user ID or device ID.

Action 502. The user profile retriever 51 may check a user cache 52 comprised in the radio network node 12 to determine or identify a number of other UEs currently connected with e.g. same credentials. That, is the user cache 52 may store input parameters of connected UEs and the user cache may be used to identify UEs associated with the same user and/or same access point.

Action 503. The user cache 52 may further segregate all the UEs connected at that time (e.g. to the same user) and may send, to a user interaction component 53 comprised in the radio network node 12, the info about the connected UEs.

Action 504. If it is more than one connected UE, the user interaction component 53 may send the IDs such as names of UEs connected at that time to the UE 10 in a graphic user interface, e.g. through a html page or similar displaying a selection screen for the UE 10 device enabling the user of the UE 10 to make a priority order selection.

Action 505. The user may then transmit the indication e.g. select or set a priority order for the connected UEs by inputting priority order and/or percentage of total bandwidth into the graphic user interface. The user may thus choose to assign high priority to frequently used & important UEs, e.g. the UE 10, over other UEs.

Action 506. The user interaction component 53 receives the indication indicating the priority order and may pass the priority order to a dynamic bandwidth allocation component 54 comprised in the radio network node 12.

Action 507. Depending on the total bandwidth allocated to the radio network node 12, number of UEs connected and the indication indicating priority of the UEs received as input from the user, the dynamic bandwidth allocation component 54 uses a learning component 55 such as an algorithm and allocates bandwidth to each UE. The learning component 55 learns priority of the UEs based on past behaviour.

Action 508. A bandwidth management component 56 may then send the bandwidth allocated to the UE 10, and bandwidth may be adjusted for already connected UEs too.

Figure 6:
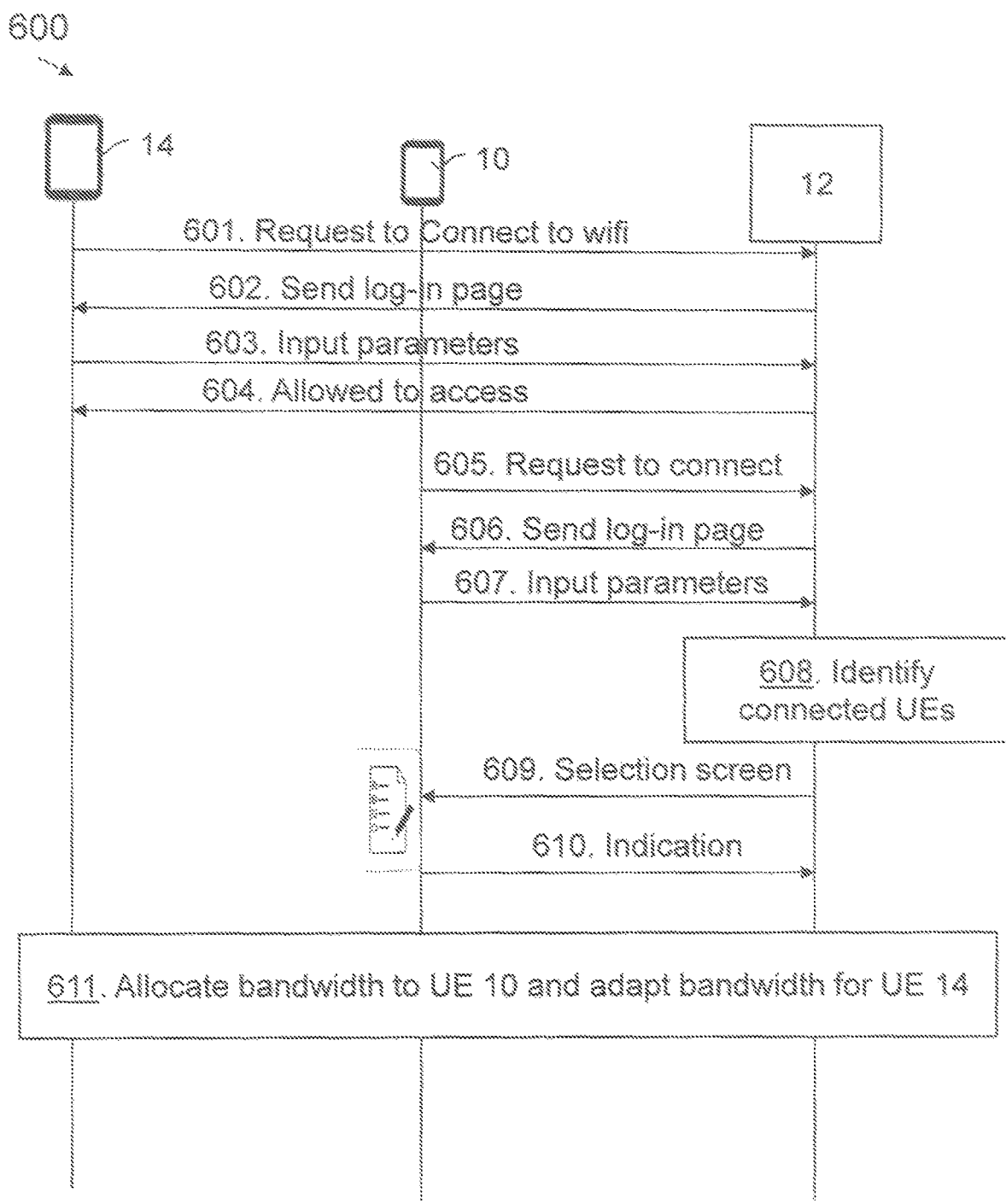
FIG. 6 shows a combined flowchart and signalling scheme according to some embodiments herein.

FIG. 6 is a combined signalling scheme and flowchart 600 according to an example of some embodiments herein where two UEs, exemplified as the UE 10 and the second UE 14. FIG. 6 discloses a dynamic bandwidth management between multiple UEs of e.g. a preferred user connected to a WiFi hotspot using a same access identity such as a user name.

Action 601. The second UE 10 may request to connect to the Wifi when entering coverage controlled by the radio network node 12. Thus, the user enters the WiFi hotspot and gets the Internet access. The radio network node 12 may thus get the user identity and may retrieve the user profile of the user.

Action 602. The radio network node 12 may then send a log-in page for the second UE 14.

Action 603. The user of the second UE 14 may input and transmit the input parameters such as user name and password into the log-in page. The second UE may also add ID of the type of UE or UE ID indicating type or capacity of the second UE 14.

Action 604. The radio network node then allocates bandwidth to the second UE 14 and transmits confirmation that the second UE 14 is allowed to access the wifi network. Thus, the radio network node 12 may provide the bandwidth to the connected second UE 14 based on the user profile of the user, and the user is allowed to browse with e.g. the total bandwidth on the only connected second UE 14.

Action 605. The UE 10 may then be powered on entering the wifi network and requesting to connect to the wifi network.

Action 606. The radio network node 12 may then send a log-in page for the UE 10.

Action 607. The user of the UE 10 may input and transmit the input parameters such as user name and password into the log-in page. The UE 10 may also add ID of the type of UE or UE ID indicating type or capacity of the UE 10. The user may thus connect another UE such as the UE 10 through the same user name.

Action 608. The radio network node 12 may then determine or identify that the second UE 14 is currently connected with e.g. same input parameters. Thus, the radio network node 12 may authenticate the user and may find out that a US for the same user is already connected.

Action 609. The radio network node may then request indication input from the UE 10 by transmitting a selection screen to the UE 10. E.g. the user management system in the radio network node 12 may send a redirect URL webpage displaying the list of connected UEs for the same user and prompts the user to set his preference for his connected UEs.

Action 610. The user of the UE 10 makes the selection by inputting the indication such as priority level and/or percentage of total bandwidth of the different UEs, and transmits the indication to the radio network node 12. Hence, the user may choose which UE that should get higher bandwidth for faster browsing depending on needs of the user or services.

Action 611. The radio network node 12 then allocates the first bandwidth to the UE 10 as indicated and may adapt the bandwidth allocated to the second UE 14 based on the first bandwidth. Thus, upon receiving preferences i.e. the indication, of the user, the user management system in the radio network node 12 may adapt the bandwidth between the connected UEs and provide bandwidth to each UE based on the indication(s). The user management system in the radio network node 12 may keep track of the user profile, the allocated bandwidth, the UEs connected to the radio network node 12 and priority at that point of time. For example, the total allocated bandwidth for a platinum user is 30 Mbps. A user logs in to WiFi with his laptop and gets the complete bandwidth 30 Mbps allocated to it. When the user logs on to the WiFi with same credentials in e.g. an iPhone, the user gets the priority order selection screen in the iPhone. The user selects the iPhone as high preference over the laptop. Now the user management system in the radio network node may allocate 20 Mbps to the iPhone and 10 Mbps to the laptop based on some learning algorithm.

Embodiments herein provide a dynamic bandwidth allocation for user preferred UEs in wireless communication networks. Real time reprioritization of user preference over UE may be achieved, and the bandwidth provided to a UE may be the result of the learning method that considers both the user input and bandwidth profile for the user.

Figure 7:
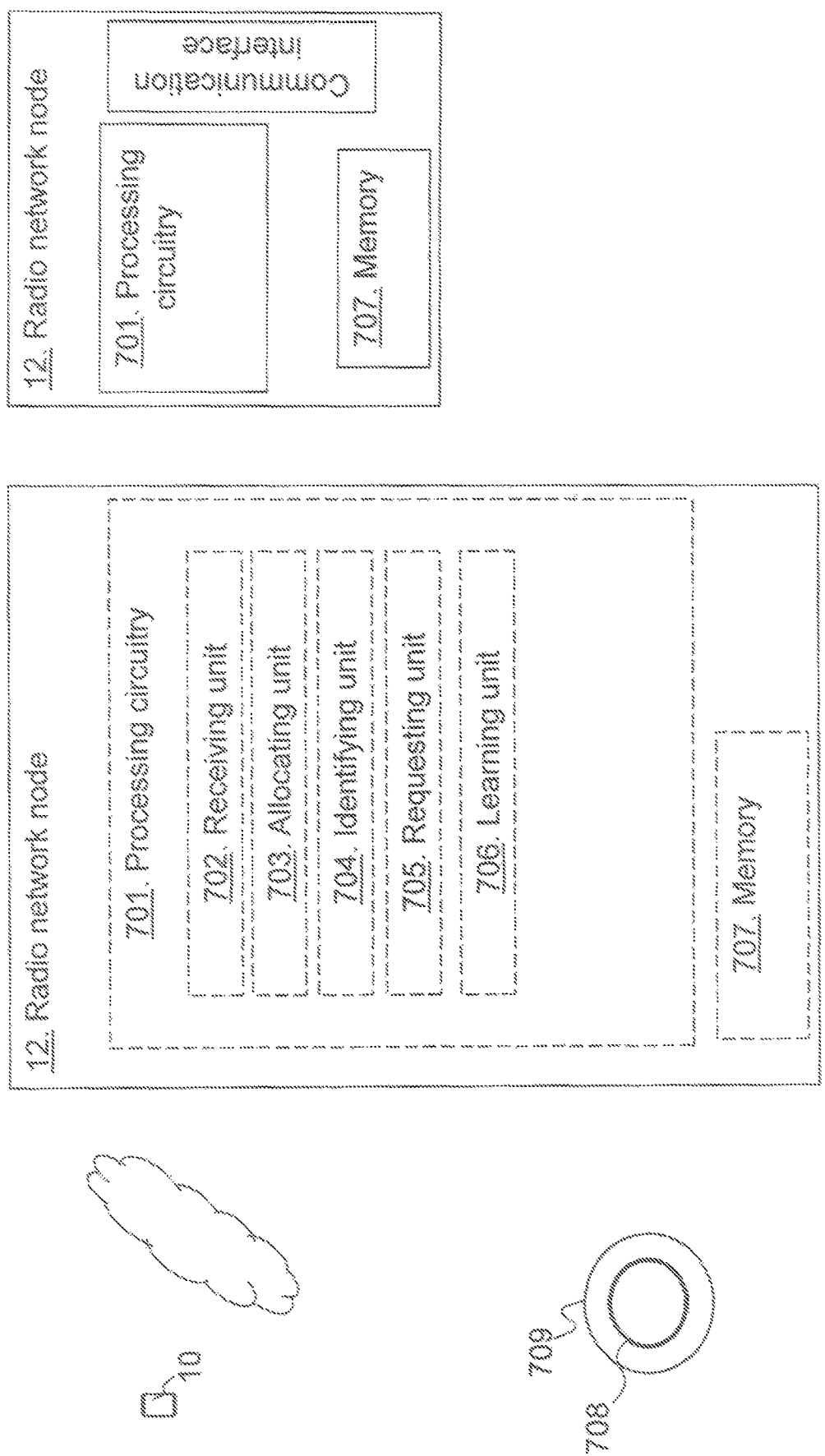
FIG. 7 shows a block diagram depicting a radio network node according to embodiments herein.

FIG. 7 is a block diagram 700 depicting the radio network node 12, in two embodiments, for handling communication of data for the UE 10 served in the service area associated with the radio network node 12 in the wireless communication network 100. The radio network node 12 may be adapted for handling communication of one or more UEs and may e.g. be a wifi controller also referred to as WLAN controller.

The proxy node 12 may comprise processing circuitry 701, e.g. one or more processors, configured to perform the methods herein.

The radio network node 12 may comprise an receiving unit 702, e.g. a module, a receiver, or a transceiver. The radio network node 12, the processing circuitry 701, and/or the receiving unit 702 is configured to receive the indication from the UE 10, wherein the indication indicates the priority level for bandwidth allocation compared to other UEs. The UE and other UEs are of different types of UEs and/or UEs of different capabilities. The indication may comprise the priority level, such as a value indicating order of priority, and/or the percentage of the total bandwidth.

The radio network node 12 may comprise an allocating unit 703, e.g. a module, or a scheduler. The radio network node 12, the processing circuitry 701, and/or the allocating unit 703 is configured to allocate the first bandwidth out of a total bandwidth to the UE 10 for communication, wherein the first bandwidth is allocated in size based on the indication.

The radio network node 12, the processing circuitry 701, and/or the receiving unit 702 may be configured to receive one or more input parameters from the UE, which one or more input parameters indicate identity of a user of the UE and/or type of the UE. The one or more input parameters may comprise the identity of the UE 10, the user name associated with the UE 10, and/or the password.

The radio network node 12 may comprise an identifying unit 704. The radio network node 12, the processing circuitry 701, and/or the identifying unit 704 may be configured to identify the other UEs taking the received one or more input parameters into account. The radio network node 12, the processing circuitry 701, and/or the identifying unit 704 may be configured to identify the other UEs belonging to a same user as the UE 10.

The radio network node 12 may comprise a requesting unit 705. The radio network node 12, the processing circuitry 701, and/or the requesting unit 705 may be configured to request the UE 10 to provide the indication to the radio network node 12. The radio network node 12, the processing circuitry 701, and/or the requesting unit 705 may be configured to request the UE 10 to provide the indication by being configured to provide the graphic user interface to the UE 10, wherein the graphic user interface comprises one or more fields for the UE to input the indication.

The radio network node 12 may comprise a learning unit 706. The radio network node 12, the processing circuitry 701, and/or the learning unit 706 may be configured to use the learning method for learning allocation of bandwidth mapped to UE identities and/or types of UEs. Types may be defined as UEs of different capabilities and/or certain IDs. The learning method may be based on past behaviour of one or more UEs and/or user of UEs.

The radio network node 12 may further comprise a memory 707. The memory comprises one or more units to be used to store data on, such as, allocation of bandwidth mapped to UE identities and/or types of UEs, indications, selections at the graphical user interface, UEs types, applications to perform the methods disclosed herein when being executed, and similar. The radio network node 12 may further comprise a communication interface such as transmitter, receiver and/or transceiver.

The methods according to the embodiments described herein for the radio network node 12 are respectively implemented by means of e.g. a computer program product 708 such as a computer program, comprising instructions, i.e., software code portions, which, when executed on at least one processor, cause the at least one processor to carry out the actions described herein, as performed by the radio network node 12. The computer program product 708 may be stored on a computer-readable storage medium 709, e.g. a universal serial bus (USB) stick, a disc or similar. The computer-readable storage medium 709, having stored thereon the computer program product, may comprise the instructions which, when executed on at least one processor, cause the at least one processor to carry out the actions described herein, as performed by the radio network node 12. In some embodiments, the computer-readable storage medium may be a non-transitory computer-readable storage medium. Thus, the radio network node may comprise the processing circuitry and the memory, said memory comprising instructions executable by said processing circuitry whereby said radio network node is operative to perform the methods herein.

Figure 8:
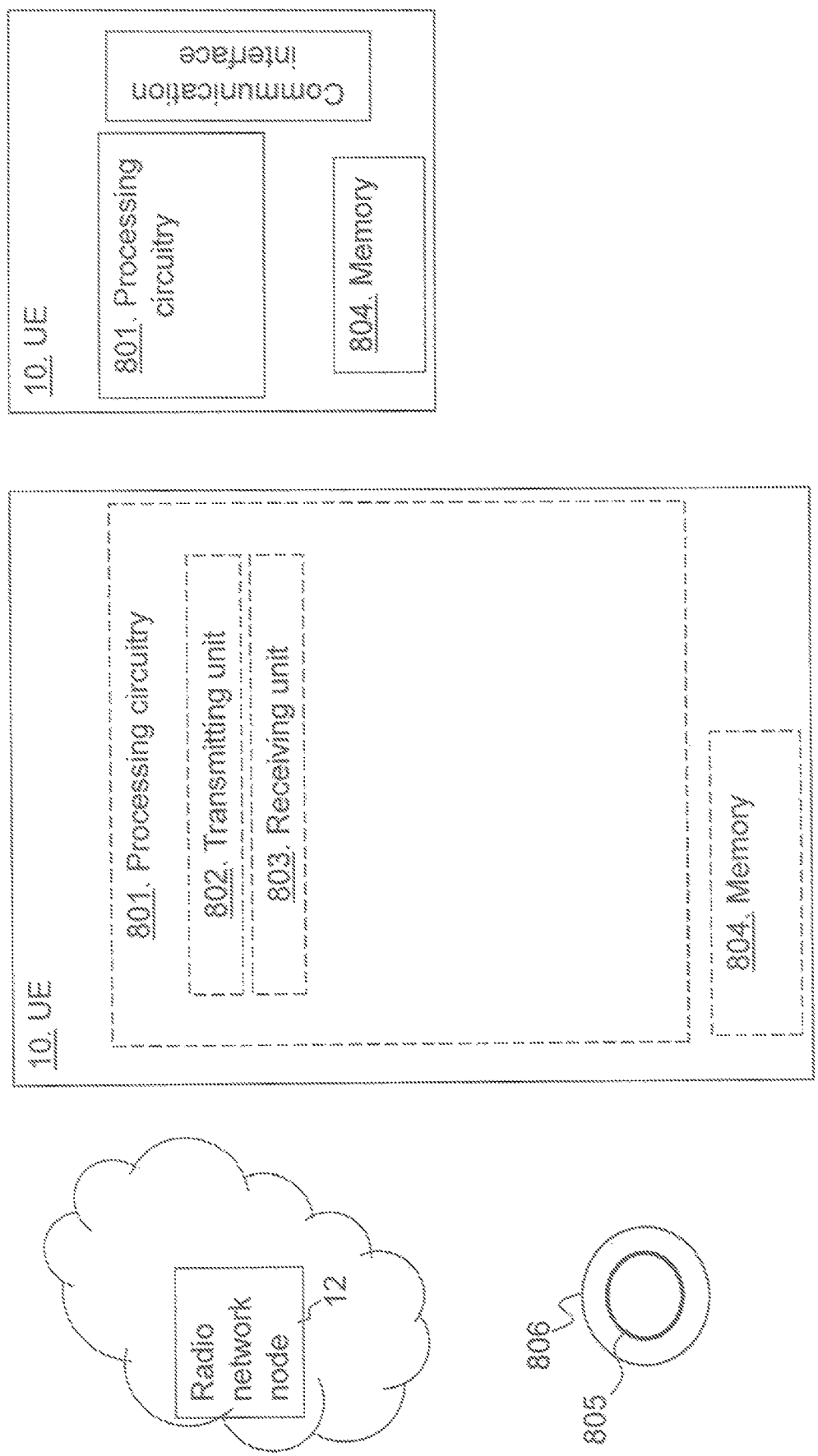
FIG. 8 shows a block diagram depicting a UE according to embodiments herein.

FIG. 8 is a block diagram 800 depicting the UE 10, in two embodiments, for handling communication of data in the service area associated with the radio network node 12 in the wireless communication network 100.

The UE 10 may comprise processing circuitry 801, e.g. one or more processors, configured to perform the methods herein.

The UE 10 may comprise a transmitting unit 802, e.g. a module, a transmitter, or a transceiver. The radio network node 12, the processing circuitry 801, and/or the transmitting unit 802 is configured to transmit the indication to the radio network node 12, wherein the indication indicates the priority level of bandwidth allocation compared to other UEs. The UE and other UEs may be of different types of UEs and/or different capabilities. The indication may comprise the priority level and/or the percentage of the total bandwidth. The radio network node 12, the processing circuitry 801, and/or the transmitting unit 802 may further be configured to transmit the one or more input parameters to the radio network node 12, which one or more input parameters indicate identity of the user of the UE and/or the type of the UE. The one or more input parameters may comprise the identity of the UE, the user name associated with the UE, and/or the password.

The UE 10 may comprise a receiving unit 803, e.g. a module, a transmitter, or a transceiver. The radio network node 12, the processing circuitry 801, and/or the receiving unit 803 may be configured to receive the request from the radio network node 12, wherein the request requests the UE 10 to provide the indication to the radio network node 12. The request may comprise the graphic user interface for the UE 10, wherein the graphic user interface comprises one or more fields for the UE 10 to input the indication.

The UE 10 may further comprise a memory 804. The memory comprises one or more units to be used to store data on, such as, allocation of bandwidth mapped to UE identities and/or types of UEs, indications, UE IDs, user names, UEs types and type ID, applications to perform the methods disclosed herein when being executed, and similar. The UE 10 may further comprise a communication interface such as transmitter, receiver and/or transceiver.

The methods according to the embodiments described herein for the UE 10 are respectively implemented by means of e.g. a computer program product 805 such as a computer program, comprising instructions, i.e., software code portions, which, when executed on at least one processor, cause the at least one processor to carry out the actions described herein, as performed by the UE 10. The computer program product 805 may be stored on a computer-readable storage medium 806, e.g. a universal serial bus (USB) stick, a disc or similar. The computer-readable storage medium 806, having stored thereon the computer program product, may comprise the instructions which, when executed on at least one processor, cause the at least one processor to carry out the actions described herein, as performed by the UE 10. In some embodiments, the computer-readable storage medium may be a non-transitory computer-readable storage medium. Thus, the UE 10 may comprise the processing circuitry and the memory, said memory comprising instructions executable by said processing circuitry whereby said UE is operative to perform the methods herein.

Thus, it herein disclosed a system for handling communication of data for the UE 10 in the service area associated with the radio network node 12 in the wireless communication network. The UE 10 is configured to transmit the indication to the radio network node 12, wherein the indication indicates the priority level for bandwidth allocation compared to other UEs. The radio network node 12 is configured to allocate the first bandwidth out of a total bandwidth to the UE 10 for communication, wherein the first bandwidth is allocated in size based on the indication. The user equipment may in the system be further configured to transmit the one or more input parameters to the radio network node, which one or more input parameters indicate identity of the user of the UE and/or type of the UE. The radio network node may further be configured to identify the other UEs taking the received one or more input parameters into account; and to request the UE to provide the indication to the radio network node.

Figure 9:
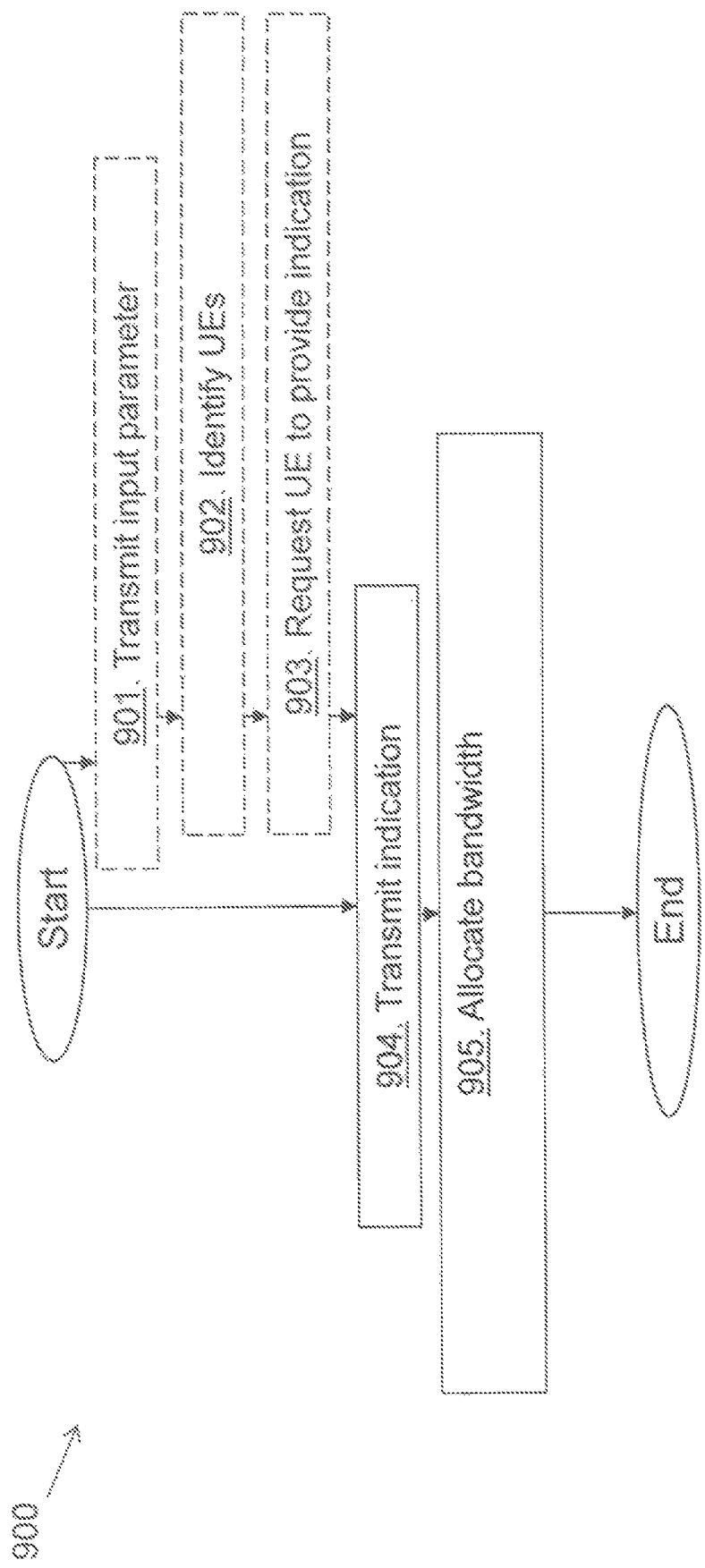
FIG. 9 shows a flowchart depicting a method performed in a system according to embodiments herein.

FIG. 9 shows a schematic flowchart 900 depicting a method performed by a system comprising the UE and the radio network node 12 according to embodiments herein. The system comprises the UE 10 and the radio network node 12.

Action 901. The UE 10 may transmit the one or more input parameters to the radio network node, which one or more input parameters indicate identity of a user of the UE and/or type of the UE.

Action 902. The radio network node 12 may identify the other UEs taking the received one or more input parameters into account.

Action 903. The radio network node 12 may request the UE 10 to provide the indication to the radio network node 12.

Action 904. The UE transmits the indication to the radio network node 12, wherein the indication indicates the priority level for bandwidth allocation compared to other UEs.

Action 905. The radio network node allocates the first bandwidth out of the total bandwidth to the UE 10 for communication, wherein the first bandwidth is allocated in size based on the indication.

The wireless communication network 100 may use one or more technologies, such as Wi-Fi, Long Term Evolution (LTE), LTE-Advanced, 5G, Universal Mobile Telecommunications System (UMTS), Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations.

As will be readily understood by those familiar with communications design, that functions unit or modules performing the methods herein may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio network node, for example.

Alternatively, several of the functional units of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware or similar, and each radio network node and UE may also comprise read-only memory (ROM) for storing software, random-access memory for storing software and/or program or application data, and non-volatile memory. Other hardware, conventional and/or custom, may also be included. Designers of communication devices will appreciate the cost, performance, and maintenance trade-offs inherent in these design choices.

It will be appreciated that the foregoing description and the accompanying drawings represent non-limiting examples of the methods and apparatus taught herein.

As such, the apparatus and techniques taught herein are not limited by the foregoing description and accompanying drawings. Instead, the embodiments herein are limited only by the following claims and their legal equivalents.

The invention claimed is:

1. A method performed by a radio network node for handling communication of data for a user equipment (UE) served in a service area associated with the radio network node in a wireless communication network, the method comprising:
receiving one or more input parameters from the UE, wherein the one or more input parameters indicate an identity of a user of the UE or type of the UE, and wherein the one or more input parameters comprise an identity of the UE, a user name associated with the UE, and a password;
requesting the UE to provide an indication to the radio network node,
wherein requesting the UE to provide the indication comprises providing a graphic user interface to the UE, and
wherein the graphic user interface comprises one or more fields for the UE to input a priority level of the UE compared to other UEs associated with the same user;
receiving the indication from the UE, wherein the indication indicates the priority level for bandwidth allocation; and
allocating a first bandwidth out of a total bandwidth to the UE for communication, wherein the first bandwidth is allocated in size based on the indication.

2. The method according to claim 1, wherein the UE and other UEs are of different types of UEs or UEs of different capabilities.

3. The method according to claim 1, further comprising identifying the other UEs taking the received one or more input parameters into account.

4. The method according to claim 3, wherein identifying the other UEs comprises identifying the other UEs belonging to a same user as the UE.

5. The method according to claim 1, wherein the indication comprises the priority level or a percentage of the total bandwidth.

6. The method according to claim 1, wherein allocating comprises using a learning method, wherein the learning method is for learning allocation of bandwidth mapped to UE identities or types of UEs, and wherein the learning method is based on past behaviour of one or more UEs or user of UEs.

7. A method performed by a user equipment (UE) for handling communication of data in a service area associated with a radio network node in a wireless communication network, the method comprising:
transmitting one or more input parameters to the radio network node, wherein the one or more input parameters indicate an identity of a user of the UE or type of the UE, and wherein the one or more input parameters comprise an identity of the UE, a user name associated with the UE, and a password;
receiving, from the radio network node, a request to provide an indication to the radio network node, wherein the request comprises a graphic user interface for the UE, and
wherein the graphic user interface comprises one or more fields for the UE to input a priority level of the UE compared to other UEs associated with the same user; and
transmitting the indication to the radio network node, wherein the indication indicates the priority level for bandwidth allocation.

8. The method according to claim 7, wherein the UE and other UEs are of different types of UEs or different capabilities.

9. The method according to claim 7, wherein the indication comprises the priority level or a percentage of the total bandwidth.

10. A radio network node for handling communication of data for a user equipment (UE) served in a service area associated with the radio network node in a wireless communication network, wherein the radio network node comprising:
a processing circuitry; and
a memory storing instructions that, when executed by the processing circuitry, cause the radio network node to:
receive one or more input parameters from the UE, wherein the one or more input parameters indicate an identity of a user of the UE or type of the UE, and wherein the one or more input parameters comprise an identity of the UE, a user name associated with the UE, and a password;
request the UE to provide an indication to the radio network node,
wherein requesting the UE to provide the indication comprises providing a graphic user interface to the UE, and
wherein the graphic user interface comprises one or more fields for the UE to input a priority level of the UE compared to other UEs associated with the same user;
receive the indication from the UE, wherein the indication indicates the priority level for bandwidth allocation; and
allocate a first bandwidth out of a total bandwidth to the UE for communication, wherein the first bandwidth is allocated in size based on the indication.

11. The radio network node according to claim 10, wherein the UE and other UEs are of different types of UEs or UEs of different capabilities.

12. The radio network node according to claim 10, wherein the radio network node is further configured to identify the other UEs taking the received one or more input parameters into account.

13. A user equipment (UE) for handling communication of data in a service area associated with a radio network node in a wireless communication network, wherein the UE comprising:
a processing circuitry; and
a memory storing instructions that, when executed by the processing circuitry, cause the UE to:
transmit one or more input parameters to the radio network node, wherein the one or more input parameters indicate an identity of a user of the UE or type of the UE, wherein the one or more input parameters comprise an identity of the UE, a user name associated with the UE, and a password;
receive, from the radio network node, a request to provide an indication to the radio network node, wherein the request comprises a graphic user interface for the UE, and wherein the graphic user interface comprises one or more fields for the UE to input a priority level of the UE compared to other UEs associated with the same user; and transmit an indication to the radio network node, wherein the indication indicates a priority level of bandwidth allocation compared to other UEs.

14. The user equipment according to claim 13, wherein the UE and other UEs are of different types of UEs or different capabilities.

15. The user equipment according to claim 13, wherein the indication comprises the priority level or a percentage of the total bandwidth.

\* \* \* \* \*